Patented July 26, 1927.

1,636,931

UNITED STATES PATENT OFFICE.

ALEX WENDLER, OF CHARLOTTENBURG, GERMANY, ASSIGNOR TO JULIUS FALCK, OF BERLIN-TEMPELHOF, GERMANY, AND CHARLES HENRY HUBERICH, OF THE HAGUE, NETHERLANDS.

METHOD TO INCREASE THE CROPS OF PLANTS AND FRUITS.

No Drawing. Application filed April 15, 1926, Serial No. 102,304, and in Germany April 22, 1925.

In olden times already large stretches of land have been fertilized by watering them artificially. Lately the crops are increased by covering the soil with waterproof-paper, roofing board or something like it. In this covering holes are punched in which the plants are set. The plants set in the soil thus covered grow quicker and have a larger size. Weeds cannot grow. Heavy rain makes the soil hard and it has to be worked up again. This is not necessary if the soil is covered with the above mentioned material. This covering keeps the soil warm and the moisture is retained. This system has been especially introduced in hot countries for tobacco, pineapples, cucumbers, Spanish pepper, sugar beets, and radishes, In moderate climates, this method will be of great advantage.

Lately experiments have been made to increase the crops by means of electricity, by putting wires over the ground or in the soil. Through this method the crops of plants and fruits also are increased.

Generally the ends of the wires are connected with a source of electric energy, but it has been found, that this, under certain conditions, is not necessary. For example there will be a current, if the wires are stretched in certain directions, preferably in the direction north-south, to the magnetic field of the earth, this current being caused by the telluric and atmospheric currents of electricity. So currents of 10-20 milliamperes can be stated to flow in these wires. The efficiency of the currents depends but little on their strength, and yet these currents are proved by many experiments to have a considerable crop increasing effect. The reason of this fact is not exactly known, the heating effect of these weak currents is practically zero and much too weak, as to explain the efficiency. Perhaps it may be the electrolytic effect upon the salts contained in the ground, which makes them dissolve easier, perhaps the invisible rays are the reason to which today the formation of ozone is to be attributed.

It must be kept in mind, that only in using the telluric electric currents the wires must be stretched parallel to each other in certain directions, while in connection with a generator the wire may be imbedded in the waterproof material in any form.

This invention combines the crop increasing effect of the method in covering the ground with waterproof material with the crop increasing effect of electricity, this purpose is reached in this way, that a system of metal threads is imbedded in waterproof material, for instance by imbedding it between two layers of paper and making this waterproof by means of tar or oil or paraffin or any other suitable material.

If this waterproof material containing the conducting wires is put on the soil and the threads are loaded with electricity, these electric currents extend over the whole field and improve the growing. If necessary the soil may be heated by electric currents sent through the paper-board.

What I claim is:

Improvements in method to increase the crop of plants and fruits by covering the soil with waterproof material as paper or the like, which contains electric conducting wires loaded by generators or by atmospheric electricity.

In testimony whereof I have signed my name to this specification.

ALEX WENDLER.